United States Patent Office
3,491,670
Patented Jan. 27, 1970

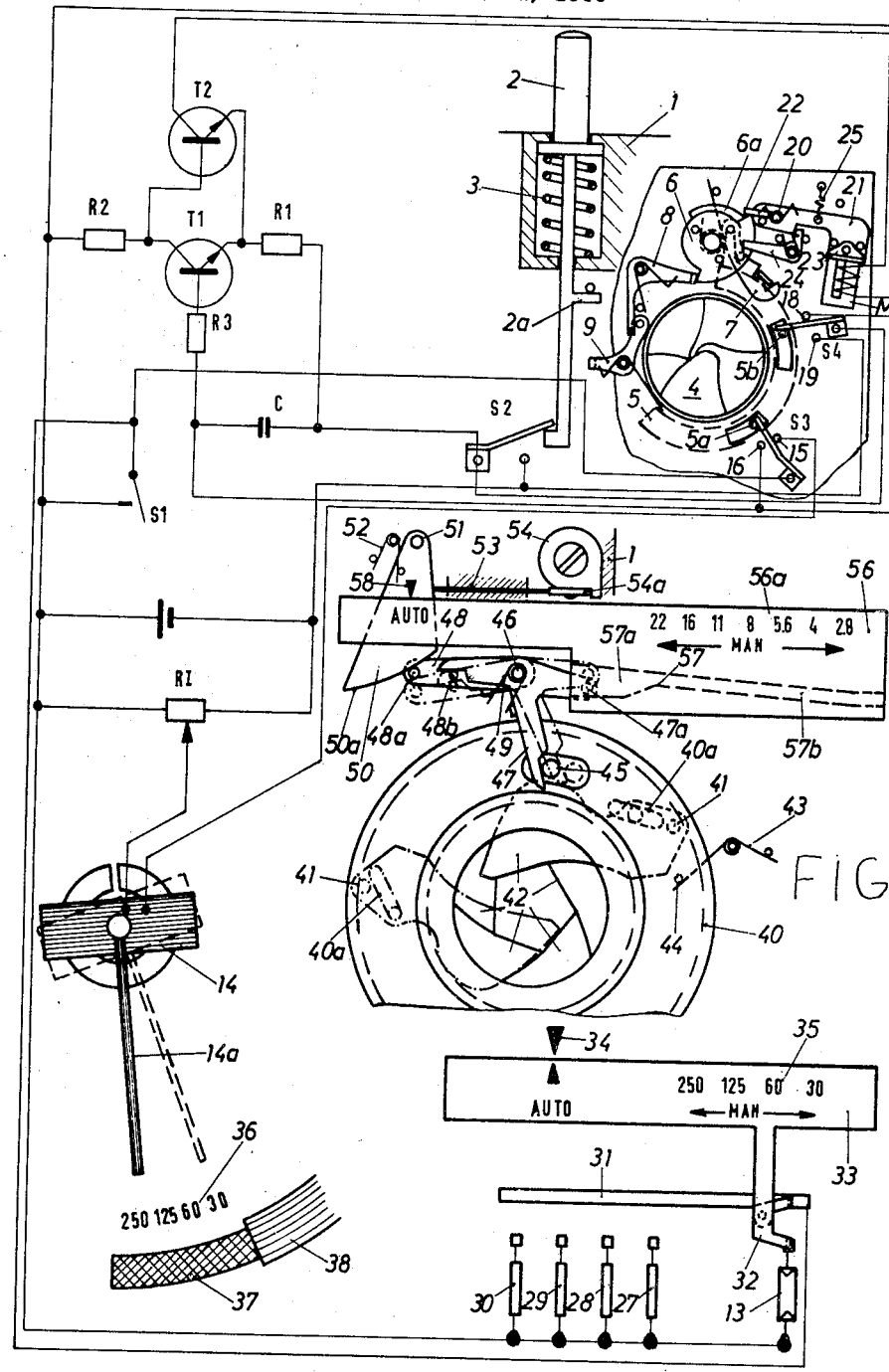

3,491,670
PHOTOGRAPHIC CAMERA WITH AN AUTOMATIC FILM SENSITIVITY SETTING DEVICE
Waldemar T. Rentschler, Calmbach, Black Forest, Germany, assignor to Prontor-Werk Alfred Gauthier G.m.b.H., Calmbach, Black Forest, Germany, a corporation of Germany
Filed Nov. 21, 1966, Ser. No. 595,917
Claims priority, application Germany, Nov. 23, 1965, P 38,177
Int. Cl. G03b 7/00
U.S. Cl. 95—31        9 Claims

ABSTRACT OF THE DISCLOSURE

A photographic camera is provided with a setting device for film sensitivity wherein a certain diaphragm opening is assigned to each film sensitivity value for use with a film cartridge. The film cartridge has a film sensitivity indicator which when inserted into the camera sets the diaphragm opening in accordance with the particular film sensitivity. A diaphragm operating mechanism is provided as is a film sensitivity setter which has a selector for setting the camera to an "AUTO" working range with fixed film sensitivity-stop coordination to another "MAN" working range in which the stops can be set freely. The film sensitivity setter has a clutch connection to the diaphragm operating mechanism which becomes effective only when the selector is set in the "AUTO" working range. When the selector is set in the "MAN" working range, the clutch connection is releasable by the selector from the film sensitivity setter. The diaphragm operating mechanism is adjustable by the selector when the clutch connection is released for freely setting the stops.

---

This invention relates to a photographic camera with a setting device for film sensitivity, and more particularly, to such a camera with an aperture stop for each film sensitivity value, which is automatically controlled by a film cartridge or film cassette having a film sensitivity indicator.

In cameras of simple design it is known to take into consideration films of different sensitivity when setting the exposure by assigning a certain aperture stop to each film sensitivity. This means that for a film of a certain sensitivity the camera is operated with one single diaphragm opening. It is also known, to provide facile handling, to set the diaphragm automatically by a film cartridge or film cassette equipped with a key adapted to the respective film sensitivity, such as a cam or the like which adjusts the aperture mechanism when the cartridge or cassette is inserted.

It is an object of this invention to enlarge the field of application for cameras of the type described above by relatively simple structural means in order to provide, in addition to "AUTO" working range for which one fixed stop is assigned to one certain film sensitivity, an additional working range permitting stops to be set freely.

These objects and other advantages are achieved according to this invention in that a selector means is provided whereby the camera can be set to a working range with fixed film sensitivity-stop coordination, and also to at least one addition working range permitting free stop setting. This invention furnishes, between the aperture mechanism and the film sensitivity setting device, a clutch connection with is effective only when set to the working range with fixed film sensitivity-stop coordination, but when set to the other working range, the clutch connection is releasable by the selector and the stop is settable by means of a separate setting device adjustable by the selector. A camera equipped with these features can be operated by the photographer according to his wishes and requirements, as it simplifies taking a picture by enabling him to set the diaphragm specifically in a special working range. Accordingly, this is an advantage which meets the interests of a broad range of consumers.

One particularly advantageous design of this invention, from a function as well as manufacturing standpoint, results in that the clutch connection comprises a positioning member adjustable in its setting by the film cartridge or film cassette, and a lever arrangement coordinated therewith acting directly on the diaphragm mechanism and adjustable in the "AUTO" working range by the positioning member and in the "MAN" working range by the selector. Thus, the positioning member may be expediently designed as a pivoting positioning segment which is kept in contact with the film sensitivity indicator of the film cartridge or film cassette by the force of a spring and wherein the positioning is provided with scanning cam at its end that cooperates with the lever arrangement.

In further developing the advantages of this invention, provision may also be made for the lever arrangement to be formed with a pivotable spring loaded scanning lever cooperating with the scanning cam, and with another lever mounted on the same shaft as the scanning lever and biased into contact therewith by a spring. The other lever being adapted to be in constant effective connection with the diaphragm mechanism and adjustable by a control cam provided at the selector.

Various other objects, features and advantages of this invention will be apparent from the following specification, claims and the drawings appended hereto wherein:

FIGURE 1 is a partially diagrammatic view of the automatic shutter of the camera of this invention with an electronic timing device for setting exposure time on the basis of lighting conditions either manually or automatically.

FIGURE 2 is a view of the shutter mechanism of the camera of this invention for setting the aperture stop in accordance with the film sensitivity.

Referring now to the drawings, there is illustrated in FIGURE 1 a camera with an electronic timing device which has a camera housing designated by the reference numeral 1, with a release plunger 2 guided thereon so as to be movable against the force of a spring 3. The release plunger 2 serves to release a shutter arrangement having blades or sectors 4 movable back and forth by means of a crank drive engaging a ring 5 with the crank drive, consisting essentially of a spring driven driving disk 6 and a driving pawl 7 engaging the matching sector ring 5, there is associated in order to hold it in its starting position, a pivotally mounted locking lever 8 with one end cooperating with a projection of driving disk 6 and with another end cooperating with a release lever 9 which, in turn, can be actuated by a driver 2a disposed on the release plunger 2.

Supplementing the mechanical shutter arrangement described above, this invention further provides an electronic switching device, shown schematically in the drawing, which serves to furnish the electronic timing. The electronic switching device has a battery 12, and a switch $S_2$ which can be actuated by release plunger 2 to furnish battery voltage to an electromagnet M prior to the mechanical release of the shutter. Another switch $S_3$ is provided to switch a photo resistor 13, in the "AUTO" working range of the camera, from a rotary coil measuring system 14 serving to indicate the time value to the electronic switching device. The sector ring 5 actuates the switch $S_3$, by means of a pin 5a which contacts the arm of the switch $S_3$ in the initial position of the sector ring and causes the arm to make contact with a pin 15 which is electrically connected to the rotary coil measuring system 14. When sector ring 5 leaves its starting position, the contact arm of the switch $S_3$ is adapted to follow the pin 5a and strikes against a contact pin 16 which, in turn, is electrically connected to the electronic circuit.

The electronic switching arrangement, providing for the proper timing functions after the shutter is released interrupts the operation of the shutter blade drive for the duration of desired time period, and is designed as a trip circuit which is equipped for this purpose with two transistors $T_1$ and $T_2$ and a capacitor C. Included in this circuit are a variable resistor $R_1$ serving to fix a certain threshold, a calibrating resistor $R_2$ and an additional resistor $R_3$ tuned to the former. Besides these units, the circuit has the electromagnet M which, in the open position of shutter blades 4, blocks the shutter drive by means of a locking mechanism described in greater detail hereinafter.

There is also provided in the circuit an additional switch $S_4$ which acts as a charge starting switch. This switch $S_4$ is so disposed with respect to a pin 5b attached to the sector ring 5 that the contact arm of the switch $S_4$, in the starting position of the ring, is kept in contact with contact pin 18 and strikes against contact pin 19 when the ring 5 is actuated. Due to this switching process of the switch $S_4$, which simultaneously performs the function of providing a parallel contact to switch $S_2$, the charging of capacitor C is initiated when contact is made. When capacitor C is charged, through the photo resistor 13, to the response value of the circuit, the transistor $T_1$ functions and the transistor $T_2$ blocks. As a consequence, current no longer flows through the electromagnet M, so that the locking mechanism holding shutter blades 4 in open position is released, and shutter blades 4 are free to swing back from their open into their closed position.

The locking mechanism has an armature lever 21 pivotally mounted on a pin 20 and carries at one end an armature 23 which cooperates with the electromagnet M. The armature lever 21 cooperates with an angled catch lever 24, which has a lever arm that strikes a tab 6a of driving disk 6 which is thereby blocked. In the cocked position, as illustrated in FIGURE 1 the armature 23 makes contact with the electromagnet M against the bias of a return spring 25, due to the cooperation of the drive disk 6 and the armature lever 21. The armature lever 21 stays in this position under the influence of the magnetic field built up in electromagnet M during the operation of the electronic timing device, thereby retaining the sector ring 5 in the open position of the shutter blades. However, as soon as electromagnet M is deactivated, the spring 25 pivots the armature lever 21 counterclockwise so that the catch lever 24 is no longer restrained by the armature lever 21. As a consequence, the drive disk 6 can turn lever 24 in a counterclockwise direction and can continue its run-off motion to close the shutter.

In order to be able to take other pictures than those with a timing device dependent on lighting conditions with the electronically controlled shutter arrangement described above, there are provided in the circuit of the electronic switching device, in addition to the photo resistor 13, several fixed resistors 27 to 30 to which there is assigned one common stationary slide 31. By means of the slide 31 and a slide contact 32 which respectively connects one of the resistors with slide 31 electrically, and which is fastened to a manually actuated time setter 33, the photo resistor 13 can be removed from the circuit and can be replaced by one of the resistors 27 to 30. The time setter 33 is adjustable with respect to a stationary mark 34 and carries, besides the designation "AUTO," a time scale 35 consisting of several exposure time values in the order of magnitude from, for example, 1/30 to 1/250 sec. Each time value is associated with one of the fixed resistors 27 to 30 which are effective in the "MAN" working range.

An indicating scale 36 is provided for the rotary coil measuring system 14 which is equipped with a pointer 14a, and has scale values corresponding to the aforementioned time values. The scale 36 is provided for the purpose of indicating to the photographer taking pictures in the "AUTO" working range which time value will be set for the electronic circuit. In addition to the numerical values, a colored scale can also be employed, which consists of a green field 37 and a red field 38. The photographer will recognize, from this colored scale 37, 38 and from the position of the pointer of the rotary coil measuring system 14, whether or not he can take free hand pictures without blurring with the exposure time set on the basis of the lighting conditions. Unblurred free hand pictures can be taken if the pointer 14a points within the range of the green field 37 of the scale, while usable pictures taken free hand can no longer be expected if the pointer swings into the range of the red field 38 of the scale.

In FIGURE 2 of the drawing, there is illustrated a diaphragm actuating ring 40 equipped with control slots 40a, by means of which several diaphragm blades 42, pivotable about fixed pins 41, are adapted to achieve a certain diaphragm opening. A spring 43 engaging a pin 44 attached to actuating ring 40 exerts a constant turning moment in a counterclockwise direction as viewed in FIGURE 2. Disposed on the actuating ring 40, there is a drive pin 45 engaged by a multi-armed lever 47 which pivots on a fixed pin 46. On the same shaft with lever 47 there is mounted a scanning lever 48 having a free end carrying a scanning pin 48a. The lever 48 also has a pin 48b which is biased into contact with the lever 47 by means of a spring 49.

Coordinated with this lever arrangement 46 to 48, which serves to set the aperture, is a setting segment 50 which pivots about a pin 51 and is biased by a positioning spring 52 that tends to turn the setting segment 50 counterclockwise about a mounting pin 51. The setting segment 50 cooperates with a positioning pin 53, movably guided in the camera housing 1 and influenceable by the film cartridge or film cassette 54 inserted into the camera housing. The film cartridge or cassette 54 has a control cam 54a adapted to the film sensitivity thereof, by means of which the sensitivity value is fed into the camera when the cartridge or cassette 54 is inserted so that the setting segment 50 is set in a certain position. This arrangement governs in the "AUTO" working range of the camera for feeding in the aperture value with the lever arrangement 46 to 48. Preferably, the following coordinations of aperture and film sensitivity can be arranged for a camera for the type described above:

| Film sensitivity: | Stop |
|---|---|
| 15° | 5.6 |
| 18° | 8 |
| 21° | 11 |
| 24° | 16 |
| 27° | 22 |

Besides the clutch connection 46 to 48, 50, 53 between the film cartridge or cassette 54 and shutter mechanism 40 to 44, there is also provided a selector 56 which has a working range "AUTO" and another working range "MAN." The clutch connection is effective only when selector 56 is set in the "AUTO" position, and provisions are made so that when the selector is reversed to "MAN," the clutch connection to the setting segment 50 is released and the diaphragm mechanism can be set by a separate setting device operable by the selector 56. For this purpose, a control slot 57 is built into the selector 56 which, when reversing the selector, acts upon a pin 47a disposed on lever 47 and consequently upon the diaphragm mechanism 40 to 44. Furthermore, the control slot 57 is designed so that pin 47a is freely movable in a range 57a corresponding to the "AUTO" working range, but when selector 56 is reversed, the pin 47a is influenced by a cam part 57b adapted so that diaphragm openings, for instance, "22 to 2.8" corresponding to scale 56a, can be set. For the purpose of setting the selector 56 in the respective position, a stationary mark 58 is provided.

If it is desired to use a camera equipped with this invention for automatic stop control by the film cartridge or cassette 54 in order to take pictures with exposure setting in conformity with lighting conditions, the camera is set in the "AUTO" working range. For example, this mark on the selector 56 is set so as to oppose the stationary mark 58 in which case the control slot 57b of selector 56 has no influence because the lever arrangement 46 to 48 is biased by spring 49 so that the pin 48a acts against a scanning cam 50a of the positioning segment 50. The attitude of lever arrangement 46 to 48 brought about thereby, governs the setting of diaphragm mechanism 40 to 44 whose drive pin 45 is kept in contact with the lever 47 by the positioning spring 43.

If the photographer desires to take pictures with specific aperture setting, the selector 56 can be shifted to the left with regard to FIGURE 2 until the desired aperture value has been brought into coincidence with stationary mark 58. During this process, cam 57b becomes effective and influences the lever 47 so that it is brought to a setting corresponding to the desired scale value which governs the diaphragm opening.

The use of a device for automatically feeding in and selectively reversing the aperture mechanism to specific aperture values is not restricted to the design of a camera as illustrated in the drawing. The arrangement could also be such that the specific aperture setting is used only in a range intended for taking flash light pictures. It would suffice in that case to coordinate with the "MAN" working range of the selector 56, the aperture mechanism and the electronic timing device which would be influenced simultaneously so that the desired aperture value and an exposure time of 1/30 sec. will result.

Furthermore, it is not absolutely necessary in the "AUTO" working range of time setter 33 that the time formation occurs by means of an electronic switching arrangement, rather, an automatic exposure system with rotary coil measuring device could be used just as well. Also, an automatic symbol mechanism could be provided in which the "AUTO" working range would comprise not just a single setting, but several settings which, for instance, are characterized by brightness symbols with a certain exposure time assigned to each of these symbols.

It will be understood that the foregoing description with the details of exemplary structure is not to be construed in any way to limit the invention, but that modifications may be made thereto without departing from the scope of the invention as set forth in the following claims.

Having thus described my invention, I claim:

1. A photographic camera with a setting device for film sensitivity wherein a certain diaphragm opening is assigned to each film sensitivity value for use with a film cartridge having a film sensitivity indicator that, when inserted into the camera, sets the diaphragm opening in accordance with the particular film sensitivity, comprising: a diaphragm operating mechanism; film sensitivity setting means having a selector for setting the camera to an "AUTO" working range with fixed film sensitivity-stop coordination and to another "MAN" working range in which the stops can be set freely; said film sensitivity setting means having a clutch connection to said diaphragm operating mechanism which becomes effective only when said selector is set in said "AUTO" working range, and when said selector is set in said "MAN" working range said clutch connection is releasable by said selector from said film sensitivity setting means; and said diaphragm operating mechanism being adjustable by said selector when said clutch connection is released for freely setting the stops.

2. The photographic camera of claim 1 wherein said clutch connection includes: a positioning member adjustable in its setting by the film cartridge; and a lever arrangement operably connected with said positioning member and acting upon said diaphragm operating mechanism; said lever arrangement being adjustable in the "AUTO" working range by said positioning member and in the "MAN" working range by said selector.

3. The photographic camera of claim 2 wherein said positioning member is a spring biased pivotable positioning segment operably connected with the film sensitivity indicator of the film cartridge, said segment having a scanning cam on one end thereof; and wherein said lever arrangement is engaged with said scanning cam.

4. The photographic camera of claim 3 wherein said lever arrangement has a pivotable, spring loaded scanning lever engageable with said scanning cam, and another lever pivotable on the same axis of rotation as said scanning lever and spring biased into engagement with said scanning lever, said other lever being in constant effective connection with said diaphragm operating mechanism and operable by a control cam provided on said selector when said selector is set in said "MAN" working range.

5. The photographic camera for use with a film cartridge having a film sensitivity indicator comprising: diaphragm operating mechanism for positioning diaphragm blades in the open and closed position, said diaphragm operating mechanism being adjustable to provide certain diaphragm opening stops in accordance with particular film sensitivity values; film sensitivity setting means adjustable by the film sensitivity indicator of a film cartridge, said setting means having a selector for setting the camera to an "AUTO" working range with fixed film sensitivity-stop coordination and to another "MAN" working range in which the stops can be freely set; an adjustable clutch engaged with said diaphragm operating mechanism and releasably engaged with said film sensitivity setting means, said clutch being operably engaged with said film sensitivity setting means when said selector is set in said "AUTO" working range and disengaged from said film sensitivity setting means when said selector is set in said "MAN" working range; and said selector being operably engaged with said diaphragm operating mechanism for freely setting the stops when said selector is set in said "MAN" working range.

6. The photographic camera of claim 5 wherein said clutch is engaged with said selector and said diaphragm operating mechanism when said selector is set in said "MAN" working range for freely setting the stops.

7. The photographic camera of claim 5 wherein said film sensitivity setting means has a positioning member adjustable by the film sensitivity indicator of the film cartridge; and wherein said clutch provides lever means engaged with said operating mechanism; said lever means being operably engaged with and adjustable by said positioning member when said selector is in the "AUTO" working range; and said lever means being operably engaged with and adjustable by said selector operating as a clutch connection, when in the "MAN" working range.

8. The photographic camera of claim 7 wherein said positioning member is a spring biased pivotable positioning segment operably connected with the film sensitivity indicator of the film cartridge, said segment having a scanning cam on one end thereof; and wherein said lever means is engaged with said scanning cam.

9. The photographic camera of claim 7 wherein said lever means has a pivotable, spring loaded scanning lever engageable with said positioning member and another lever pivotable on the same axis of rotation as said scanning lever and spring biased into engagement with said scanning lever, said other lever being in constant effective connection with said diaphragm operating mechanism and operable by a control cam provided on said selector when said selector is set in said "MAN" working range.

References Cited

UNITED STATES PATENTS 3,318,214  5/1967  Singer et al. _____ 95—10

NORTON ANSHER, Primary Examiner

JOSEPH F. PETERS, JR., Assistant Examiner

U.S. Cl. X.R.

95—10, 64